US011132751B2

(12) United States Patent
Luciani

(10) Patent No.: US 11,132,751 B2
(45) Date of Patent: *Sep. 28, 2021

(54) SYSTEM AND METHOD FOR SENSOR-ENHANCED INSURANCE COVERAGE AND MONITORING SERVICE

(71) Applicant: METROPOLITAN LIFE INSURANCE CO., New York, NY (US)

(72) Inventor: Terrance Luciani, Monroe Township, NJ (US)

(73) Assignee: METROPOLITAN LIFE INSURANCE CO., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/922,597

(22) Filed: Jul. 7, 2020

(65) Prior Publication Data

US 2020/0334763 A1 Oct. 22, 2020

Related U.S. Application Data

(63) Continuation of application No. 15/255,920, filed on Sep. 2, 2016, now Pat. No. 10,762,573.

(60) Provisional application No. 62/213,897, filed on Sep. 3, 2015.

(51) Int. Cl.
*G06Q 40/08* (2012.01)
*H04W 4/90* (2018.01)

(52) U.S. Cl.
CPC .............. *G06Q 40/08* (2013.01); *H04W 4/90* (2018.02)

(58) Field of Classification Search
None
See application file for complete search history.

(56) References Cited

U.S. PATENT DOCUMENTS

| 9,628,975 | B1 | 4/2017 | Watkins et al. |
| 10,347,111 | B1 | 7/2019 | Hollenstain et al. |
| 2006/0083390 | A1* | 4/2006 | Kaderavek ............... H04R 1/38 381/92 |
| 2016/0196391 | A1 | 7/2016 | Peak et al. |
| 2017/0048672 | A1 | 2/2017 | Herz et al. |

* cited by examiner

*Primary Examiner* — Joseph W. King
(74) *Attorney, Agent, or Firm* — Eric R. Garcia, Esq.; Polsinelli PC

(57) ABSTRACT

A network of sensors is utilized to capture and relay data that is relevant to specific types of insurance coverage. Sensors included in the network can be deployed as specialized devices, or can be found in existing consumer products. Behavioral and environmental data collected from the sensor network is used to establish a feedback relationship between an insurance policy holder's behavior and insurance policy pricing. Various types of insurance products can benefit from behavioral and environmental data, including health insurance, dental insurance, disability insurance and automobile insurance. Collected data can be used for other purposes, such as initial risk assessment, risk monitoring, and prevention services.

20 Claims, 1 Drawing Sheet

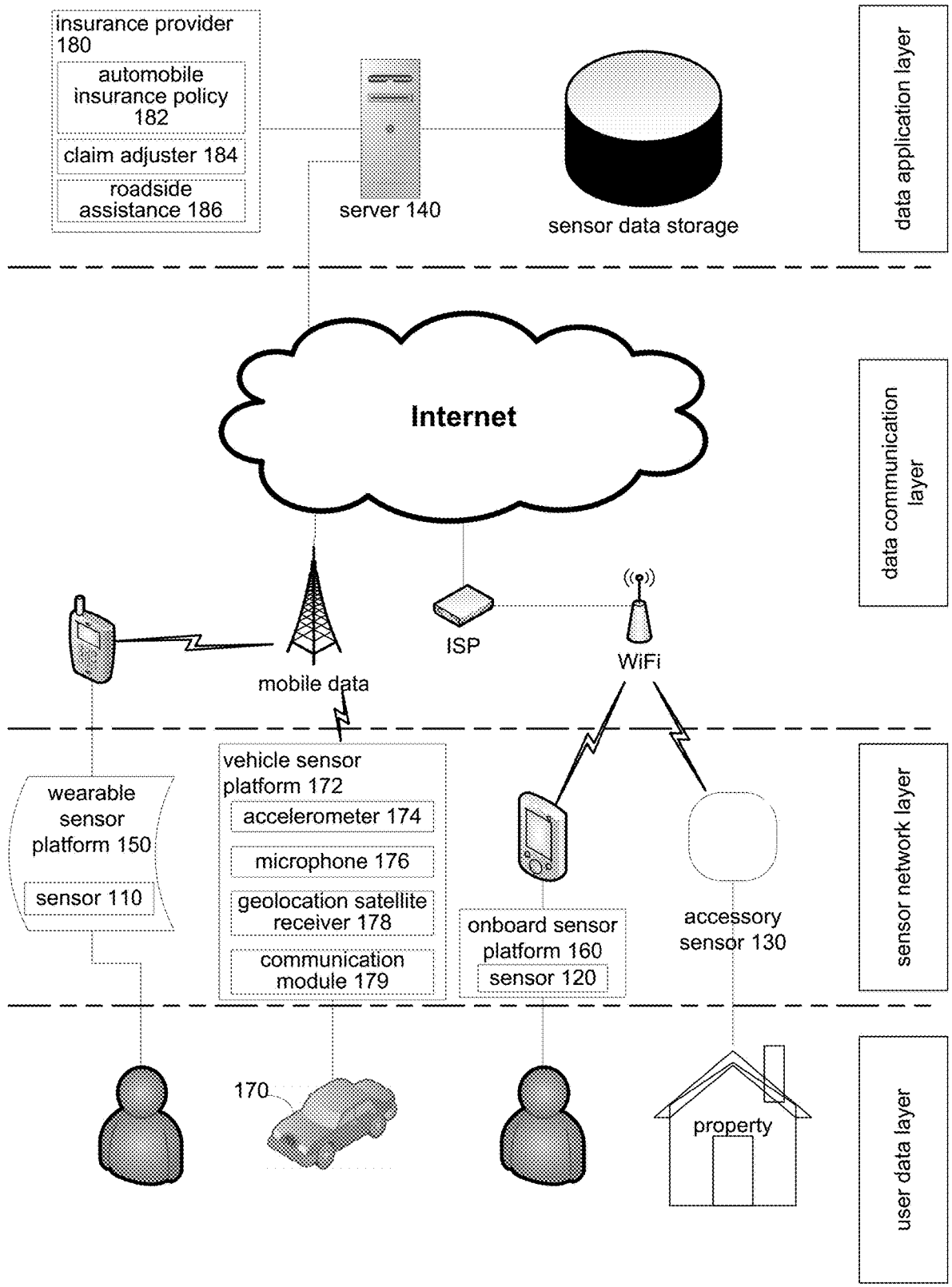

SYSTEM AND METHOD FOR SENSOR-ENHANCED INSURANCE COVERAGE AND MONITORING SERVICE

CROSS-REFERENCE TO RELATED APPLICATIONS

This application is a Continuation of, and claims priority to, U.S. Non-Provisional patent application Ser. No. 15/255,920, filed Sep. 2, 2016, entitled SYSTEM AND METHOD FOR SENSOR-ENHANCED INSURANCE COVERAGE AND MONITORING SERVICE, which claims the benefit of U.S. Provisional Application No. 62/213,897, filed Sep. 3, 2015, entitled SYSTEM AND METHOD FOR SENSOR-ENHANCED INSURANCE COVERAGE AND MONITORING SERVICE, the contents of which are incorporated herein by reference in their entireties.

FIELD OF THE INVENTION

The invention relates to systems and methods for collecting and analyzing sensor data for dynamically calculating risk of injury or loss to individuals and/or property.

SUMMARY OF THE INVENTION

The invention relates to a system of network-linked sensors or sensor packages ("sensors") distributed to collect data relevant to underwriting insurance policies.

It is an object of this invention to establish feedback relationship between an insurance policy holder's behavior and the insurance premium pricing applied to his or her policy. Network-linked sensors allow for the insurance provider to obtain data related to the policy holder's behavior and in response calculate a premium adjustment. Preferably, a complete feedback loop is established whereby the policy holder is informed of the effect of his or her behavior on the calculated adjustment, thus providing the policy holder a degree of control over their premiums by altering their behavior.

It is another object of this invention to collect behavioral and environmental data to allow for more accurate risk assessment calculations.

In one embodiment of invention, the collected data is used in conjunction with traditional risk assessment methods as a means for adjusting the estimated risk. For example, an applied risk model may overestimate a risk of loss or injury during the initial underwriting process. In this example, later collected data may refute the estimation with actual behavioral data for the insured and the risk estimate can be adjusted downward to compensate for the difference. In another example, an underestimated risk of loss or injury can likewise be adjusted upward in response to the collected data. Continuing with these examples, the insurance provider may also use the data collected from the system in the aggregate to adjust its overall risk model to provide more accurate risk assessments. According to another aspect, the collected data informs changes to existing insurance policies and premium pricing changes.

In various embodiments, the described network-linked sensors capture environmental data that is relevant to the particular insurance policies in question. In one embodiment targeting health insurance, the health insurance policies are valued in relation to the various health and injurious risks encountered by the insured.

In various embodiments, collected data is aggregated across the network to provide insurers with valuable insight into behaviors across selected demographics. This is useful to the insurer to inform its risk assessment models, as well as to third parties for the same or other commercial purpose.

In various embodiments, other benefits are achieved. A distributed sensor network allows for the application of additional data collection, such as crash detection, flood/disaster detection, claim check, and security monitoring.

A distributed sensor network allows for the offering of two categories of related services through various embodiments: risk assessment and safety monitoring. These services can be offered separately, or together. Alternatively, the safety monitoring service can be offered as an incentive to policyholders to participate in the risk assessment service. A risk assessment service could utilize the data collected from one or more sensors in the network to estimate future risks. This is achieved in certain embodiments through an analysis of collected data to determine present behavior, demographics, location, and other metrics that contribute to risk. In one embodiment, data on preventative measures taken by an individual (e.g., consistently wearing a seatbelt when driving) is used to downgrade that individual's risk of death resulting from an automobile accident. In another embodiment, the physical activities of an individual is compared to others within the same or similar demographic to estimate risk of developing ailments, such as heart disease. Other embodiments could determine whether an individual takes risk avoidance measures and use this data in assessing risk.

A safety monitoring service could utilize a similar set of data collected in real time or near real time to detect present risks, or actual bodily injury or property damage. In one embodiment, one or more sensors are configured to detect an automobile accident through data interpreted as a sudden deceleration of the vehicle. In another embodiment, sensors are configured to determine an individual's location and a communication can be sent to that individual if he or she is in or near a high crime risk area. In yet another embodiment, the same sensors described below that are configured to determine an individual's health risks can also be utilized to collect real time data on an individual's present health condition and injury. Continuing with this embodiment, wearable sensors may be configured to detect whether an individual suffers from a heart attack, fall or other injury requiring immediate assistance.

In yet another aspect, an auxiliary service can also be offered to respond to detected injuries or damage, or manual requests for assistance transmitted through the sensor network. In this same embodiment, emergency services and/or an insurance claim adjuster can be rapidly mobilized to the scene of the detected accident.

BRIEF DESCRIPTION OF FIGURES

This invention is described with particularity in the appended claims. The above and further aspects of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

The drawing figures depict one or more implementations in accord with the present teachings, by way of example only, not by way of limitation. In the figures, like reference numerals refer to the same or similar elements.

FIG. 1 is a functional diagram illustrating functional parts in an exemplary embodiment of the invention.

DETAILED DESCRIPTION

Certain illustrative embodiments will now be described, including specific methods and systems for collecting insurance related data from a network of sensors. However, it will be understood by one of ordinary skill in the art that the methods described herein may be adapted and modified as is appropriate for the application being addressed and that the systems and methods described herein may be employed in other suitable applications, and that such other additions and modifications will not depart from the scope of invention.
Sensor Network A network of sensors is utilized to capture and relay data that is relevant to the specific type of insurance coverage. The category of sensors included in the deployed network will vary according to the types of data needed to assess risk associated with the particular insurance policies. This is described in greater detail below.

The sensors within the network may be identical or different, and can be packaged individually or in combination with other sensors. An individual insurance policy holder ("client") may possess, carry, or install one or more sensor 110 and 120 and accessory sensor 130 to be included in the sensor network.

Certain self-contained devices already exist that capture and relay some of the relevant data and can be used as part of the sensor network. For example, consumer fitness activity monitors (e.g., FitBit, Nike Fuel Band) typically contain at least an accelerometer that measures the wearer's acceleration through space in multiple axis and is further equipped with a power source, memory and communication system (e.g., USB, Bluetooth, WiFi). The collected acceleration data may then be used to calculate the wearer's activity level over time. Activity monitors may also or exclusively contain a variety of sensors 110 that capture other relevant personal data, including, but not limited to: geolocation satellite receivers (e.g., GPS), heart rate sensors (e.g., optical heart rate sensor package), blood oxygen detectors (e.g., pulse oximeter), and stress level detectors (e.g., galvanic skin response, breath rate monitor).

Many of these sensors 120 can alternatively be found in mobile devices (e.g., mobile phones, tablet computers) or their peripherals. Mobile devices may also be equipped with sensors 120 that capture environmental data relevant for certain applications, such as temperature, atmospheric pressure, or elevation. These devices can be configured to capture relevant data through these sensors 120 and integrated into the sensor network by way of their onboard communications systems (e.g., cellular data, WiFi, Bluetooth, USB). Mobile devices also can provide the additional benefit of an "always-on" or near always-on data link through a mobile data network, which allows for relaying and/or synchronizing captured data at a near real-time basis. Mobile devices also proved a channel for two-way, audio-visual communications. This capability can be leveraged into other beneficial features. For example, the insurance provider 180 may transmit messages to a mobile device to prompt a client to collect certain data. The onboard camera may also be used as a means for authenticating the mobile device user. For instance, to establish that a client is actually engaged in the tracked activity to prevent fraud.

Consumer devices offer the benefit of offering a preexisting, tested and ubiquitous suite of sensors that can be easily incorporated into the sensor network. It is also appreciated that specialized devices can be utilized to provide any of the above capabilities and can also be customized to provide further benefits according to the specific needs of the embodiment. These are described in greater detail below.

The sensors 110 and 120 and accessory sensor 130 in the sensor network relay captured data to insurance provider servers 140 accessed by the insurance provider 180. This can be accomplished over a variety of communication channels that are available to the different sensor platforms, such as a wearable sensor platform 150, an onboard sensor platform 160 and a vehicle sensor platform 172. Many sensor platforms will store captured data on onboard memory until the stored data can be transmitted to a computer by a communication module 179 over USB, Bluetooth, WiFi, or other data communication protocol. The transmitted data can then also be sent to a remote server through an Internet protocol transmission. Mobile devices also can send stored data by other wireless data communication transmission standards, such as cellular data service. Specialized sensor platforms may also be configured to utilize cellular data or other wireless data communication transmission standards to transmit captured data.

In a preferred embodiment, each sensor in the sensor network is uniquely identifiable and can be associated with a client. A client would have the ability to register his or her sensor devices to create these associations. The insured may also provide sensor devices to the client.
Health Insurance Health insurance costs are closely tied to the various risks posed to the health of its prospective and existing policy holders ("clients"). These health risks can result from internal factors, such as existing or future medical conditions, or external ones (e.g., automobile accidents, job-related injuries). Health insurance would greatly benefit from real world data associated with these risks. The types of data and the associated conditions listed below are merely illustrative.

Data related to a client's fitness activity over time can provide useful information for estimating the client's cardiovascular health and the various risks of associated medical conditions. For example, there is a correlation between an individual's activity level and cardiovascular health, and their risk of cardiovascular diseases (e.g., heart failure, coronary artery disease, hypertensive heart disease). A client's stress levels can also be used as another data point to estimate the risk of stress-related conditions, such as high blood pressure, gastrointestinal disorder, heart attack, stroke, mental illness (e.g., anxiety, depression), and even cancer. Blood oxygen levels may also be used to estimate health risks from conditions such as hypoxemia and may further indicate other health issues.

To track these and other relevant data points on an ongoing basis, self-contained, body worn devices containing the appropriate sensors are used to capture this data. Activity monitors are particularly well suited for this purpose as they can capture data over the long term. Mobile devices may also be configured to capture this data. This is preferably accomplished through a mobile software application installed on the mobile device.

Sensor platforms can also exist as fixed or semi-fixed installations for intermittent data collection. In one embodiment, an interview with a client may be conducted to include the collection of data related to his or her health. This can be accomplished using non-portable sensor platforms to capture many of the same data described above. In some instances, this may be preferred as more accurate measurements are possible with more sophisticated equipment that may not be feasibly made portable.

In another example, a video recording of the prospective client may be taken and an algorithmic analysis of the resulting video may be used to estimate the client's health and/or emotional well being (i.e., stress levels, depression, etc.). This can be accomplished through a mobile device with an onboard, preferably front-facing, camera, or through an in-house interview process using traditional video recording methods. Various video-based emotion detection software algorithms can translate and quantify a client's emotional response based on visual recognition of facial expressions, audio detection of vocal patterns, and the like. This data can be used to estimate the client's risk of associate conditions, such as depression, mood disorders, and anxiety.

It may further be beneficial to inform the client of the relationship between the collected activity data and his or her insurance costs. This could provide an incentive for the client to adopt or continue their healthier lifestyle and potentially reduce healthcare costs for the client, the insurance provider 180, and the other clients. Preferably, mobile devices are used to communicate this information to the client through an installed mobile application. This mobile application may be the same used to configure the client's mobile device for data capture. Utilizing a mobile device for this communication provides the added benefit of near real-time reinforcement of the client's behavior.

Various external risks may also be determined using different sensor platforms. A client's risk of injury from environmental conditions can be estimated based on his or her location. Geolocation satellite receivers can be used for this purpose by capturing the client's geolocation over time. This can be cross checked against a database of perils associated with those geolocations. The amount of time spent at certain locations can also be used to estimate the risk presented to the client from the associated perils. For example, in one embodiment, it is determined that a client lives in a relatively safe area. However, geolocation data provided by sensors on his phone indicate that he spends extended periods of time in high crime areas. This insight can be used to adjust his traditional risk assessment upwards.

In a preferred embodiment, a mobile device is configured by an installed mobile application to act as a network-linked sensor platform to collect data relevant to health insurance as described above. The mobile application can provide further benefits by providing an enhanced communication portal between an insurance provider 180 and its clients. This can be used for various functions, such as transmitting feedback on tracked behavior to the client, storing or retrieving historical profiles on captured data, and selecting customization options for security and privacy settings (i.e., selecting or excluding types of data to capture). Additionally, the mobile application portal may be used to file and/or monitor the status of health insurance claims. The mobile application can also be used to authenticate the client in order to verify that the client is accurately being tracked and to prevent/deter fraud. Authentication can be performed, for example, by prompting the client to answer predetermined security questions or by requiring the client to take photos or record a video during tracked activities.

Much of the same data collected to monitor possible risks to an insured's health can be leveraged to provide monitoring services also related to the insured's health and safety. For example, the same accelerometer sensor data that assesses an individual's activity levels, if monitored in real time, can be used to detect accidents and injury as they occur. This can be offered as a service for monitoring slip and falls, other accidents, and heart attacks.

Collected geolocation data can also be used to detect and respond to unintentional s: slip and fall (valuable for elderly), roaming, which is a serious risk to those with Alzheimer's disease and other forms of (dementia), accidents, heart attacks.

When sensor platforms are connected to the sensor network in this embodiment, insurers or others providing the monitoring service can alert emergency responders if any of these events are detected.

Disability Insurance

Disability insurance claim disbursements relate to a client's inability to work. The client's activity level—pre- and post-claim—is therefore relevant to this assessment. Geolocation data over time may also be relevant for this purpose. This data may be used to verify a client's disability claims by comparing tracked activities with the claimed disability. For example, an insurance provider may suspect the truthfulness of a client's claim that a leg injury prevents him from working if it obtains tracked activity data showing that he ran five miles after the claimed injury.

Much of this same data is also relevant to health insurance as described above. The embodiments and examples of sensor implementation disclosed in the previous section are therefore equally applicable here.

The client incentives for tracking activity in disability insurance are different from those in health insurance (i.e., client typically wishes to prove inactivity as opposed to activity), so the authentication and fraud prevention measures in this embodiment would have additional requirements. The sensor packages must be able to track client activities when the client, attempting to commit fraud, desires to appear inactive. To prevent a client from simply removing a sensor package, such as a fitness tracker, an additional sensor to detect removal of the device may be used. A specialized device with this feature could also be used. In another embodiment, data from the on-board accelerometer of a fitness tracker, mobile device, or other platform can be analyzed to determine when the device is not being worn at all.

Dental Insurance

Dental insurance claims relate to the condition of a client's teeth and gums. A significant risk factor for these conditions are the daily preventative measures taken (i.e., brushing and flossing) to maintain a healthy environment in the oral cavity. Data on a client's brushing habits and saliva composition could therefore be relevant to estimating his or her risk for developing a number of dental conditions, such as cavities (dental caries), gingivitis, periodontitis, and tooth erosion.

A sensor platform that includes at least an accelerometer can capture data related to a client's brushing activities, such as brushing frequency. This sensor platform may be found in an existing toothbrush product, or may be retrofitted onto a toothbrush. In either case, the sensor platform is linked to the sensor network and associated with a client's policy, such as automobile insurance policy 182. The collected brushing activity data is then used to augment and improve the dental risk assessment for the client.

Other types of sensors may be included in the sensor platform to collect relevant data. For example, low saliva pH can contribute to an unhealthy environment in the oral cavity as this can erode the enamel on teeth and cause dental caries. Low pH is often caused by high bacterial activity resulting from poor dental hygiene, unhealthy diet, or a combination of both. A pH sensor installed on the brush end of a toothbrush could collect data on saliva pH, and when linked to the sensor network, this data can be used to monitor a client's risk of developing dental conditions.

The monitoring of brushing activity and saliva pH can also be offered as a service. An assessment of the quantity and quality of brushing habits can reported to a client as a way to track and improve this behavior. Saliva pH data over time can also be reported in conjunction with the collected brushing activity data to illustrate the relationship between these two data points. This allows for the client to see how improved brushing habits can have a positive and tangible effect on their oral health.

Automobile Insurance

Automobile insurance claims often originate from collisions between vehicles or with other objects. A sensor platform, such as the vehicle sensor platform 172, that detects and measures collisions that is installed on an insured vehicle 170 and linked to the sensor network could expedite and improve claims processing.

A sensor platform 172 equipped with an accelerometer 174 can detect the occurrence of damage-causing collisions by measuring sudden acceleration or deceleration. A detection threshold can be set to screen for measurements that may otherwise be attributed to intentional acceleration or braking. The magnitude of collision and the resulting damage can also be estimated from the degree of acceleration measured by the accelerometer.

A collision can also be detected by a sensor platform 172 equipped with a microphone 176 that captures sounds generated by one or more body panels. A detection profile can be set to monitor for sounds indicative of damage causing collisions. The magnitude of collision and the resulting damage can also be estimated from the type and intensity of captured sounds captured by the microphone. Sensors installed on multiple body panels could also distinguish the parts of the car 170 affected by the collision.

A sensor platform 172 also equipped with a geolocation satellite receiver 178 (e.g. GPS) could record additional data related to collisions, such as geolocation and the insured vehicle's velocity at the time of collision.

The data captured by these sensors can be used to speed the deployment of claims adjusters 184 and roadside assistance 186 (e.g. tow truck) to the scene of an accident. The captured data also gives the insurance provider 180 at least an approximation of the nature and extent of the damage before the claims adjuster 184 arrives to investigate. The insurance provider 180 can use this approximation to begin the claims process, which can reduce the overall time to process the damage claim. The insurance provider 180 can also use the captured data to compare with the client's account of the events leading up to an accident as a means for fraud detection.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed:

1. A vehicle damage assessment system comprising:
   an accelerometer disposed in a vehicle configured to generate data representing acceleration;
   a plurality of microphones disposed on a plurality of body panels of the vehicle, each microphone of the plurality of microphones configured to generate data representing sounds generated by a corresponding body panel of the vehicle upon occurrence of damage to the corresponding body panel;
   a processor configured to:
   identify, based on the sound data generated by at least one microphone of the plurality of microphones, a particular body panel of the plurality of body panels damaged by a collision involving the vehicle; and estimate a magnitude of the collision based on: the accelerometer acceleration data and the identified damaged particular body panel.

2. The risk assessment system of claim 1, wherein the processor is further configured to estimate the magnitude of the collision based on an intensity of the sound data generated by at least one microphone of the plurality of microphones.

3. The risk assessment system of claim 1, wherein the processor is further configured to estimate a resulting amount of damage caused by the collision based on: the accelerometer acceleration data and the identified damaged particular body panel.

4. The risk assessment system of claim 1, wherein the processor is further configured to determine an occurrence of the collision based on the accelerometer acceleration data.

5. The risk assessment system of claim 1, further comprising a geolocation sensor configured to generate data representing a geolocation of the vehicle.

6. The risk assessment system of claim 5, wherein the processor is further configured to calculate a velocity of the vehicle based on the vehicle geolocation data.

7. The risk assessment system of claim 6, wherein the processor is further configured to estimate the magnitude of the collision based on the calculated velocity of the vehicle.

8. The risk assessment system of claim 1, wherein the processor is further configured to determine whether the accelerometer acceleration data exceeds a pre-determined threshold to distinguish acceleration data indicative of a collision from acceleration data indicative of intentional acceleration and braking.

9. The risk assessment system of claim 1, wherein the processor is further configured to monitor whether the data generated by at least one microphone of the plurality of microphones matches a profile indicative of a collision.

10. The risk assessment system of claim 1, further comprising a communications module, the communications module configured to transmit to a remote server at least one of the sound data generated by at least one microphone of the plurality of microphones, the accelerometer acceleration data, and the estimated magnitude of the collision.

11. A method for assessing damage to a vehicle, the method comprising:
receiving by a processor acceleration data from an accelerometer disposed in a vehicle;
receiving by the processor sound data generated by at least one microphone of a plurality of microphones, wherein the plurality of microphones are disposed on a plurality of body panels of the vehicle, and wherein each microphone of the plurality of microphones is configured to capture sounds generated by a corresponding body panel of the vehicle upon occurrence of damage to the corresponding body panel;
identifying by the processor, based on the sound data generated by the at least one microphone of the plurality of microphones, a particular body panel of the plurality of body panels damaged by a collision involving the vehicle; and
estimating by the processor a magnitude of the collision based on: the accelerometer acceleration data and the identified damaged particular body panel.

12. The method of claim 11, further comprising estimating the magnitude of the collision based on an intensity of the sound data generated by at least one microphone of the plurality of microphones.

13. The method of claim 11, further comprising estimating a resulting amount of damage caused by the collision based on: the accelerometer acceleration data and the identified damaged particular body panel.

14. The method of claim 11, further comprising determining an occurrence of the collision based on the accelerometer acceleration data.

15. The method of claim 11, further comprising receiving geolocation data of the vehicle from a geolocation sensor.

16. The method of claim 15, further comprising calculating a velocity of the vehicle based on the vehicle geolocation data.

17. The method of claim 16, further comprising estimating the magnitude of the collision based on the calculated velocity of the vehicle.

18. The method of claim 11, further comprising determining whether the accelerometer acceleration data exceeds a pre-determined threshold to distinguish acceleration data indicative of a collision from acceleration data indicative of intentional acceleration and braking.

19. The method of claim 11, further comprising monitoring whether the data generated by at least one microphone of the plurality of microphones matches a profile indicative of a collision.

20. The method of claim 11, further comprising transmitting to a remote server at least one of the sound data generated by at least one microphone of the plurality of microphones, the accelerometer acceleration data, and the estimated magnitude of the collision.

* * * * *